Jan. 15, 1963 D. TORRES Re. 25,321

VENDING MACHINE FOR CYLINDRICAL OBJECTS
HAVING JAM PREVENTING MEANS
Original Filed Sept. 8, 1958

INVENTOR.
David Torres
BY
ATTORNEY.

United States Patent Office

Re. 25,321
Reissued Jan. 15, 1963

25,321

VENDING MACHINE FOR CYLINDRICAL OBJECTS HAVING JAM PREVENTING MEANS

David Torres, Sunnyvale, Calif., by the Vendo Company, Kansas City, Mo., a corporation of Missouri, assignee Original No. 3,026,002, dated Mar. 20, 1962, Ser. No. 759,570, Sept. 8, 1958. Application for reissue July 6, 1962, Ser. No. 209,275
10 Claims. (Cl. 221—67)

Matter enclosed in heavy brackets [ ] appears in the original patent but forms no part of this reissue specification; matter printed in italics indicates the additions made by reissue.

This invention relates to vending machines and particularly coin merchandisers of the type having spaced guiding partitions for receiving two vertical columns of articles therebetween in staggered relationship and selectively controllable mechanism underlying the stack and having swingable gate means engaging the lowermost article to thereby cause articles to be successively released from article columns as said gate means is swung and upon insertion of proper coins.

Although staggered stack vending machines of the type referred to herein have been employed for a considerable period of time, problems have arisen relative to jamming of articles to be vended and particularly cylindrical objects such as soft drink bottles. Cylindrical articles of this character have tended to wedge between the sides of the bottle partitions, particularly when such bottles are rough and worn whereby the outer surfaces of the same have greater coefficience of friction when in interengagement than is present with new bottles.

It has been determined that the weight of the bottles in each column forming a part of the staggered stack and pressing on the two lowermost bottles, causes the latter to move outwardly relative to each other thereby flexing the partitions in opposite directions and wedging the bottles against the side of the partitions, particularly the bottle next above the next to be vended bottle resting on the swingable gate control mechanism beneath the stack.

Bottles have also jammed between the vending machine partitions by virtue of the bottles icing up and thereby sticking together whereby normal vending is interrupted and furthermore, vending of bottles neck first has in some instances cause the butt of the bottle next above the vended bottle to hang at the next operational cycle.

It is, therefore, the most important object of the present invention to provide novel structure adapted to be mounted on the spaced guide partitions receiving the two vertical columns of articles in staggered relationship and which structure includes spaced means disposed to engage certain of the cylindrical articles at the lower end of the stack for preventing jamming of the bottles between the partitions during release of the bottles successively from alternate vertical columns of bottles.

Another important object of the invention is to provide structure adapted for preventing jamming of bottles in staggered stack vending machines wherein the novel structure includes a pair of opposed, substantially vertical spacer plates adapted for mounting on the guide partitions and disposed a sufficient distance apart to cause the cylindrical article next above the lowermost bottle engaging the gate, out of engagement with the cylindrical article directly above the lowermost bottle and in the same vertical column therewith whereby jamming of the articles during vending is prevented by virtue of the weight of the stack being removed from the article next above the lowermost bottle and which would otherwise tend to wedge the two lower bottles between the partition walls.

Also an important object of the invention is to provide spacer plates as referred to above having upper opposed sections in closer spaced relationship and lower opposed areas whereby not only the article directly above the lowermost article but also the cylindrical article next above the bottle referred to, are both maintained out of engagement with the bottle next above the lowermost article to thereby assure that no weight whatsoever of the stack is carried by the bottle in a position next above the lowermost article.

Other important objects of the invention relate to the provision of spacer plates as described wherein the offset surfaces of each plate are interconnected by intermediate angular zones causing the articles to slide smoothly over the spacer plates; to the provision of an arcuate margin on the uppermost edge of each plate to prevent the bottles hanging up on such margin; to outwardly extending integral tab means on each plate serving to mount the same on the partitions of the vending machine in an improved manner; to a spacer plate which may be readily constructed with a conventional stamping machine thereby lowering the cost of the unit and without materially increasing the over-all price of the machine; to a spacer plate wherein a wear-resistant material may be placed on the outer surfaces of the plate to increase the longevity of the same; and to other important objects and details of construction which will become obvious or be explained more fully as the following specification progresses.

Figure 2:
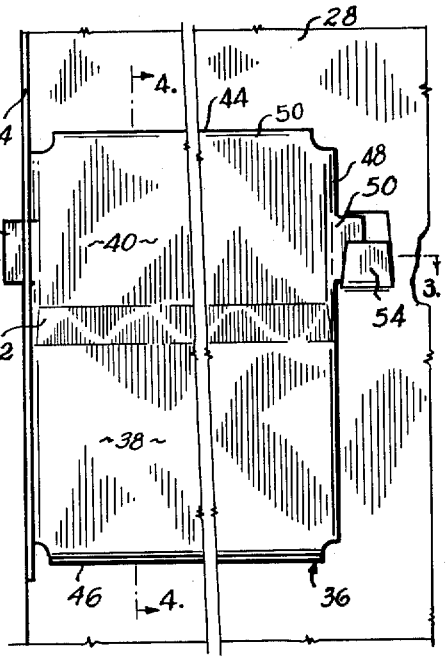
FIG. 2 is a fragmentary side elevational view of one of the spacer plates showing the same mounted in operable position.
Figure 3:
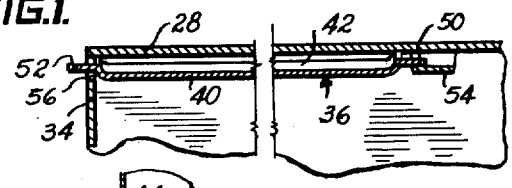
Figure 5:
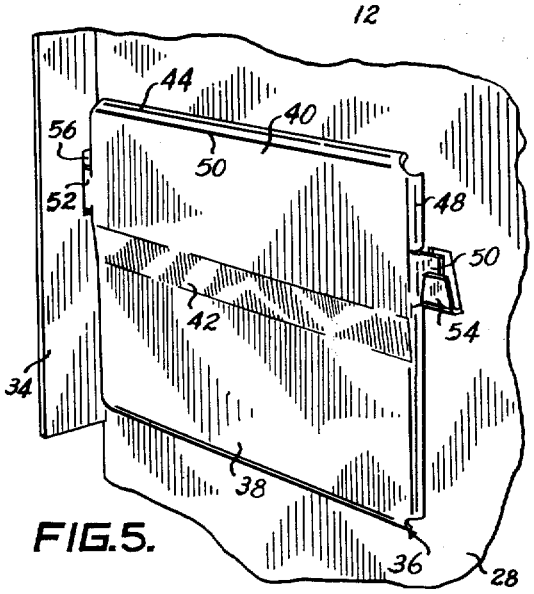
Figure 4:
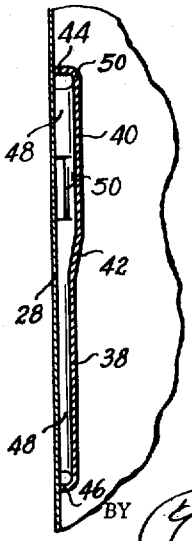

FIGS. 3 and 4 are cross-sectional views taken on lines 3—3 and 4—4 respectively of FIG. 2; and FIG. 5 is a perspective view of one of the spacer plates carried by a partition of the vending machine.

Machine 10 is preferably of conventional construction for receiving a plurality of articles to be vended and includes an outer casing (not shown) suitably insulated and having mechanism incorporated therein for cooling the interior of the casing and coin controlled structure for effecting rotation of gate means in the nature of an arm 12, about the axis of shaft 14 each time coins of proper value are placed in the machine.

Figure 1:
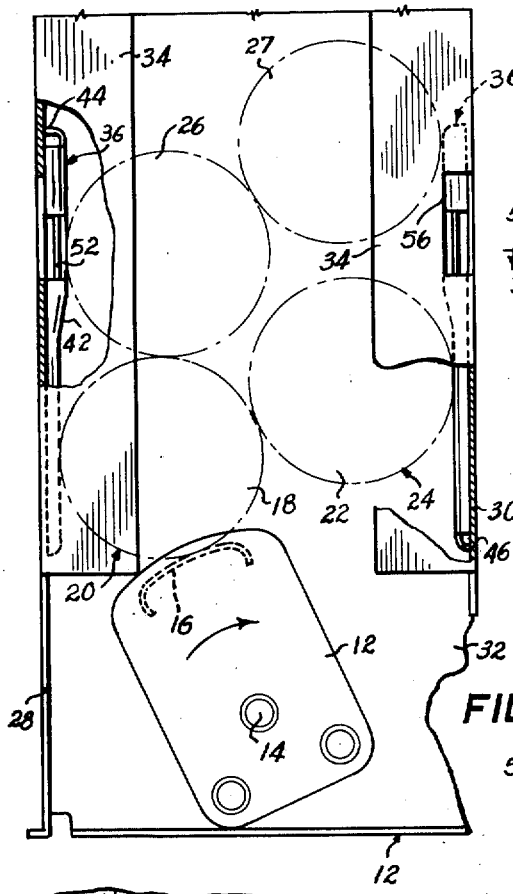
FIGURE 1 is a fragmentary front elevational view of a portion of a vending machine and illustrating the present spacer plates mounted in operable positions on the guide partitions and with cylindrical articles to be vended illustrated in dotted lines.

It is to be understood that gate arm 12 secured to shaft 14 for rotation therewith mounts a bail 16 normally positioned horizontally and adapted to engage the lowermost cylindrical article 18 of a vertical stack broadly numerated 20 with gate arm 12 being swingable to another position whereby bail 16 engages the lower cylindrical article 22 of another stack 24 with article 18 being vended to the customer. As shown in FIG. 1, cylindrical article 26 is located in staggered relationship to cylindrical article 22 while article 27 of column 24 is likewise offset with respect to cylindrical article 26. In this manner, there is presented a pair of vertical columns or stacks with the bottles or other cylindrical articles thereof located in staggered relationship.

Structure forming a part of machine 10 for supporting and guiding the cylindrical articles in stacks 20 and 24, comprise a pair of upright, parallel partitions 28 and 30 interconnected along rear upright longitudinal extremities thereof by a panel 32 which may form a part of the casing if desired. Relatively narrow strips 34 integral with the upright longitudinal margins of partitions 28 and 30 and remote from panel 32 extend laterally from corresponding partitions 28 and 30 in opposite directions and toward each other as shown in FIG. 1. Partitions 28 and 30 are spaced apart a sufficient distance to permit a maximum number of cylindrical articles to be placed therebetween in staggered relationship.

The construction of gate arm 12 as well as the mechanism for actuating the same to successively release cylindrical articles from stacks 20 and 22 between partitions 28 and 30, forms no part of the present invention and will not be described in detail.

For a better understanding of mechanism of this type, reference is herein made to U.S. Patent No. 2,762,524, U.S. Patent 2,585,017 and U.S. Patent 2,369,882. Also, it is contemplated that a plurality of spaced partitions 28 and 30 be provided for permitting vending of cylindrical articles from a number of different stacks and with the mechanism within the machine selectively controlling operation of individual swingable gates disposed beneath respective staggered stacks of articles.

The present invention comprises structure in the form of substantially identical spacer plates generally designated 36 and mounted on the innermost opposed faces of each of the partitions 28 and 30 in a manner to be more specifically defined hereinafter. Each of the spacer plates 36 has a lower substantially rectangular area 38 extending the full width of the plate as well as an upper rectangular section 40 coincident in length with area 38. As best shown in FIG. 4, upper section 40 is disposed in offset relationship to area 38 and is integral with the same through an intermediate angularly disposed zone 42 merging relatively smoothly with area 38 and section 40 respectively.

It is contemplated that spacer plates 36 be formed of a single sheet of metal suitably stamped to desired configuration and in this respect, it is to be noted that laterally extending upper flange 44 integral with section 40 and lower flange 46 forming a part of area 38, as well as side flanges 48 integral with both of the areas 38 and 40, serve to maintain section 40 and area 38 in proper spaced relationship to the proximal face of a corresponding partition 28 and 30 when spacer plates 36 are mounted on the same. Flange 44 merges smoothly with section 40 throughout a margin 50 extending substantially the entire width of a respective spacer plate 36 and substantially arcuate in transverse cross-section to present an outer convex surface.

A pair of oppositely extending integral tabs 50 and 52 lying substantially in the plane of a respective section 40, facilitate mounting of spacer plate 36 on partitions 28 and 30.

Each of the partitions 28 and 30 is provided with an inwardly struck, integral bracket 54 disposed to receive tab 50 of a corresponding spacer plate 36, while strip 34 connected to each partition 28 and 30 has a slot 56 therein adapted for receiving a respective tab 52. In this manner, spacer plates 36 are removably mounted on corresponding partitions 28 and 30 with no securing means whatsoever being necessary and with flanges 44, 46 and 48 engaging the proximal innerface of partitions 28 and 30 to maintain areas 38 and sections 40 of opposed spacer plates 36 in correct spacial disposition.

The distance between areas 38 of opposed spacer plates 36 is correlated with the space between opposed sections 40 to thereby cause lowermost cylindrical article 22 of column 24 to be located in spaced relationship to cylindrical article 26 as well as article 28 when lowermost cylindrical article 18 of stack 20 is carried by bail 16 of gate arm 12. Since cylindrical article 26 rests directly on article 18 and article 27 engages article 26 with both of the articles 26 and 27 clearing article 22, it can be recognized that the weight of the staggered stack is completely removed from article 22 and thus jamming of articles 18 and 22 between partitions 28 and 30 is precluded. Furthermore, icing up and sticking together of the bottles is obviated and there is no tendency for one of the bottles to vend neck first thereby causing the next bottle such as article 22 to hang up, especially by the butt thereof.

The provision of angular intermediate zone 42 as well as arcuate margin 50 is of importance because such surfaces prevent hanging up of the cylindrical article during descent of the same as the lowermost article is vended and there is absolutely no possibility of the bottles becoming jammed during the vending cycle.

If desired, the outermost surfaces of areas 38 and sections 40 as well as zones 42 of corresponding spacer plates 36 may be plated or otherwise coated with a relatively wear-resistant material to increase the longevity of spacer plates 36 and preclude necessity of replacing the same at more frequent intervals.

Inasmuch as spacer plates 36 may be constructed by conventional stamping operations, it can be recognized that the units may be fabricated at a minimum cost without materially increasing the price of the complete vending unit.

Another feature of the invention is the fact that all of the weight of the stack of articles is placed on bail 16 of gate arm 12 thus forcing lowermost article 18 to vend on swinging of gate arm 12 and thereby bail 16 to the opposite end of its path of travel, even though there might be a tendency for articles 18 and 22 to jam between partitions 28 and 30. It can be recognized that the gap between articles 22, 26 and 27 should be sufficient to prevent jamming of articles 18 and 22 in the manner outlined above, yet not sufficiently distanced to cause breakage of the articles if the same constitute soft drink bottles or the like.

Having thus described the invention what is claimed as new and desired to be secured by Letters Patent is:

1. In a machine for vending generally cylindrical articles of predetermined diameter, a pair of spaced, upright, supporting and guiding means for receiving a stack of side-by-side, interengaged, vertical columns of articles arranged in staggered relationship therebetween whereby the lowermost article of one of either of the columns is always below the level of the lowermost article of the other column; selectively controllable means underlying the stack and having swingable gate means engageable with the lowermost article of said one column to support the stack and movable to a position releasing said lowermost article of the one column and engageable with the lowermost article of the other column in supporting relationship to the remaining articles in the stack whereby articles are released successively from alternate columns as the gate means is swung to alternate positions thereof; and a pair of structures mounted on opposed faces of said supporting and guiding means adjacent the gate means, each of said structures having a lower upright area disposed to engage the lowermost article of a proximal column, and an upper upright section disposed to engage the next to lowermost article of a respective proximal column, respective areas of the structures being spaced *closer to* [further from] corresponding supporting and guiding means than the sections of said structures and opposed areas and sections respectively of said structures being positioned to present respective spaces therebetween each less than twice the diameter of one of said articles [and the sections] to thereby maintain the next to lowermost article of said other column out of engagement with the lowermost article of said other column whereby jamming of the articles is prevented during swinging of said gate means and successive vending of said articles.

2. In a vending machine as set forth in claim 1, wherein each of said structures comprises an upright spacer plate mounted on a corresponding supporting and guiding means.

3. [A] *In a* vending machine as set forth in claim 2, wherein said spacer plates have opposed areas at corresponding lower portions thereof sufficiently spaced apart to cause the article next above said lowermost article to be in sufficient proximity to the level of said lowermost article to thereby permit said article directly above the lowermost article and in the same vertical column therewith to directly engage said lowermost article whereby the weight of the stack of articles is taken off of said article next above the lowermost article.

4. [A] *In a* vending machine as set forth in claim 3, wherein said spacer plates have opposed sections at corresponding upper portions thereof located in sufficient proximity to cause the article next above said article directly above the lowermost article and in the same vertical column therewith to *be maintained* [maintain the latter] in spaced relationship to said article next above the lowermost article, said article directly above the lowermost article and in the same vertical column therewith being maintained in spaced relationship to said article next above the lowermost article.

5. [A] *In a* vending machine as set forth in claim 4, wherein said area of each of the spacer plates merges with said section thereof throughout an angularly disposed intermediate zone extending the entire horizontal width of a respective plate.

6. [A] *In a* vending machine as set forth in claim 4, wherein said spacer plates are provided with opposed, outwardly extending tabs lying in the major plane of respective plates, each of said supporting and guiding means having bracket and slot means therein disposed to removably receive respective tabs on corresponding plates to thereby facilitate releasable mounting of said plates on the supporting and guiding means.

7. [A] *In a* vending machine as set forth in claim 4, wherein each of the plates is provided with an integral flange projecting toward a corresponding supporting and guiding means and merging with the upper horizontal portion of the section of a corresponding plate throughout a uniformly curved margin extending the entire horizontal width of a respective plate.

8. [A] *In a* vending machine as set forth in claim 4, wherein the vertical dimension of each of said areas and sections of a corresponding spacer plate is only slightly less than the cross-sectional dimension of one of said articles.

9. [A] *In a* vending machine as set forth in claim 4, wherein the space between said sections and said areas of corresponding spacer plates is correlated to maintain the article directly above the lowermost article and in the same vertical column therewith, and the article next above the same, in substantially equally spaced relationship from the article next above said lowermost article.

10. [A] *In a* vending machine as set forth in claim 4, wherein each of said spacer plates is provided with a series of peripheral flanges extending laterally in one direction from the area and section of each spacer plate and adapted for maintaining the area and said section of corresponding plates in proper spaced relationship from said supporting and guiding means on which the same are mounted.

References Cited in the file of this patent or the original patent

UNITED STATES PATENTS

| | | |
|---|---|---|
| 1,694,897 | Washburn | Dec. 12, 1928 |
| 2,308,532 | Mills | Jan. 19, 1943 |
| 2,369,882 | Brock | Feb. 20, 1945 |
| 2,435,526 | Young et al. | Feb. 3, 1948 |
| 2,438,503 | Holt | Mar. 30, 1948 |
| 2,506,717 | Fulmer | May 9, 1950 |
| 2,836,326 | Childers | May 27, 1958 |